UNITED STATES PATENT OFFICE.

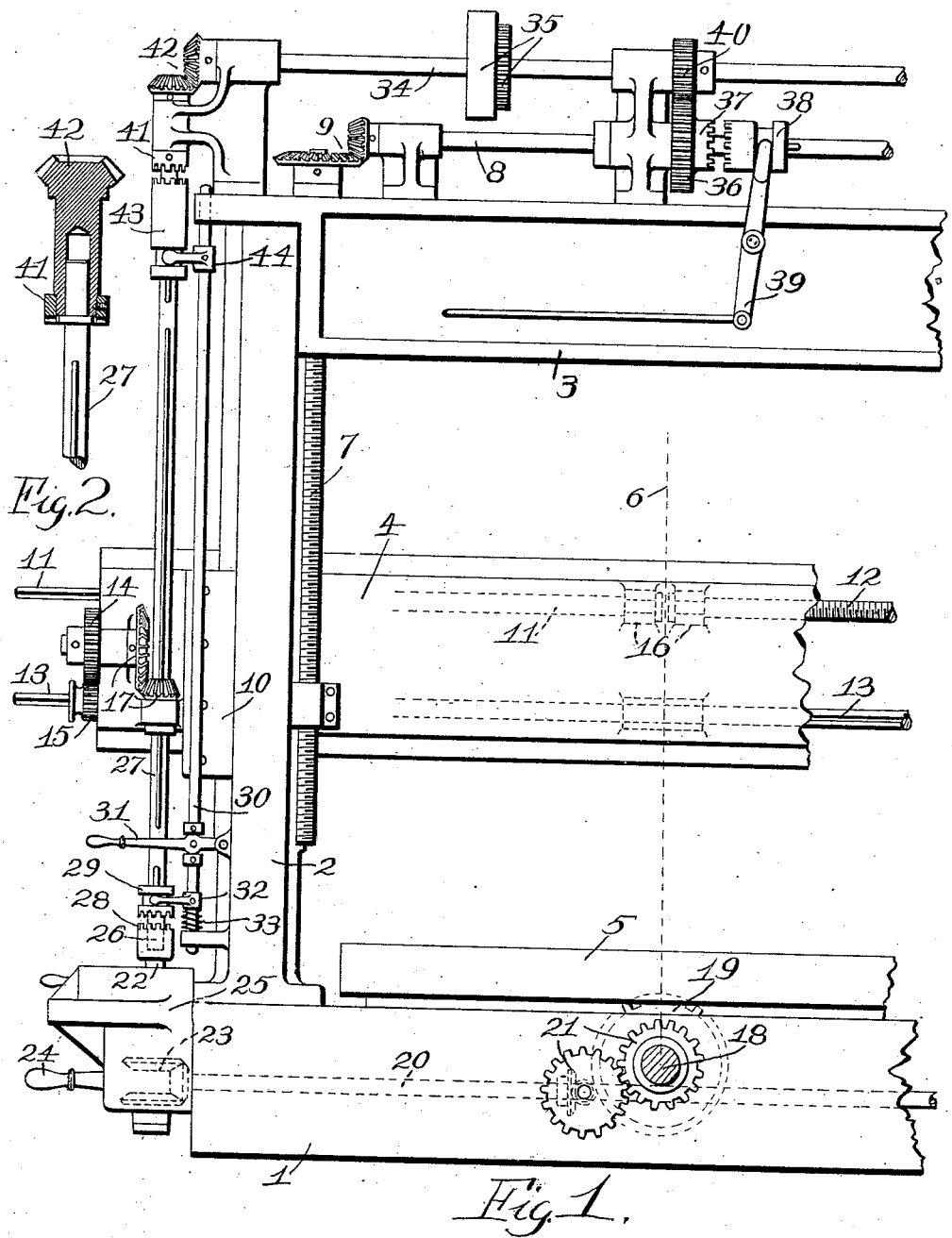

AUGUSTUS WOOD, OF HAMILTON, OHIO, ASSIGNOR TO NILES-BEMENT-POND COMPANY, OF JERSEY CITY, NEW JERSEY.

MACHINE-TOOL.

No. 854,446.

Specification of Letters Patent.

Patented May 21, 1907.

Application filed December 5, 1906. Serial No. 346,376.

*To all whom it may concern:*

Be it known that I, AUGUSTUS WOOD, a citizen of the United States, residing at Hamilton, Butler county, Ohio, have invented certain new and useful Improvements in Machine-Tools, of which the following is a specification.

The invention, pertaining to such machine tools as boring mills and planers, will be readily understood from the following description taken in connection with the accompanying drawing in which:—

Figure 1 is a partial rear elevation of a boring mill embodying an exemplification of my improvement: and Fig. 2 a vertical diametrical section of one of the gears for the transmission of the fleeting motion.

While certain general principles of my invention are applicable to both boring mills and planers the improvement has been devised with special reference to heavy boring mills and I have chosen to illustrate my invention as applied to a boring mill.

Most all boring mills are characterized by a rail vertical adjustable on the housings; rail elevating screws at the housings; power mechanism carried by the top brace for operating these screws in either direction; a saddle sliding on the rail; a screw on the rail for feeding the saddle thereon; a tool-carrying bar vertically movable on the saddle; a feed-rod mounted in the rail for transmitting vertical feeding motion to the bar; power mechanism for driving the table; and feed transmitting mechanism connected with the table driving mechanism and with the feed screw and feed rod of the rail. The feeding motion impressed upon the feed rod and feed screw of the rail is comparatively slow, and is active only when the table is in motion. The raising and lowering of the rail, being done by independent power mechanism, may be effected while the table is at rest and the table-driving mechanism idle, and this work may be done at proper speeds quite independent of any table-driving speeds or feeding speeds. The feed-transmitting motions imparted to the feed screw and feed rod of the rail are slow and not suited for fleeting the saddle and tool bar and, in addition, this feeding motion would be available only when the table was in motion. The above general description, which, by the way, applies largely to planers as well as to boring mills, has assumed but a single saddle on the rail. In double head machines, where there are two saddles on the rail, each saddle has its own independent feed screw on the rail and these screws are generally arranged to be driven at the respective opposite ends of the rail.

In the drawing:—1, indicates the bed of a boring mill: 2, the housings: 3, the top brace: 4, the rail: 5, the table: 6, the vertical plane of center of width of the machine: 7, the rail elevating screws: 8, the rail elevating top shaft: 9, bevel gears connecting this top shaft with the rail-elevating screws: 10, the rail clamps: 11, the feed screw mounted in the rail for traversing the saddle thereon: 12, the second similar screw employed if the machine is provided with two saddles: 13, the feed rod journaled in the rail for transmitting vertical feeding motion to the tool bar carried by the saddle, or to both tool bars if there are two saddles: 14, the feed gear mounted at the end of the rail: 15, the slipgear to go, selectively, on the end of the feedscrew or feed-rod and be driven by gear 14: 16, bearings on the rail for the inner ends of the feed-screw: 17, bevel gearing carried by the rail to transmit motion from a vertical feed shaft to feed gear 14: 18, the main driving shaft for the table: 19, pinion for transmitting motion from this driving shaft to the table: 20, the horizontal feed shaft extending across the base of the machine, to one side thereof in any event, and to both sides if the machine has two saddles: 21, gearing connecting the table driving shaft 18 with horizontal feed shaft 20 so that the latter always turns in harmony with the table: 22, the vertical feed shaft for transmitting feeding motion to the gearing carried by the end of the rail: 23, reversing gearing connecting shafts 20 and 22 so that vertical feed shaft 22 may be caused to turn in either direction according to the direction of feed desired: 24, feed-reversing handle: and 25, the speed-box containing gearing coöperating with shafts 20 and 22 to provide for selective variations in the rate of feed motion to be transmitted by shaft 22.

All of the parts thus far referred to are as usual in boring mills and subject to the usual variations in those parts, and the operations are as usual, it being understood, however, that it is assumed that vertical feed shaft 22 has, as is the case, an upward connection to reach the feed gearing at the end of the rail. The upward connection, while present, has not thus far been specifically referred to as it embodies peculiarities.

Proceeding with the drawing:—26, indicates a socket in the upper end of vertical feed shaft 22: 27, a splined shaft loosely stepped in this socket and having splined engagement with rail gearing 17, this splined engagement being as is usual with the long vertical feed shaft: 28, a clutch carried by the upper end of vertical feed shaft 22: 29, a sliding clutch carried by the lower end of splined shaft 27 and coöperating with clutch 28: 30, a clutch-rod sliding vertically near shaft 27: 31, a handle for raising and lowering this clutch rod: 32, an arm projecting from the clutch rod into engagement with sliding clutch 29: 33, a spring acting upwardly on the clutch rod, not to raise the rod or hold it up but merely to counterbalance its weight to some extent: 34, a power-shaft supported at the top of the housings: 35, a power device on this shaft for turning it in either direction, this power device being typified as a pulley and gear on the shaft to either or both of which the driving power may be applied: 36, a gear loose on the rail-elevating top shaft 8: 37, a clutch on this gear: 38, a sliding clutch on shaft 8 coöperating with clutch 37: 39, hand mechanism, shown as a lever and rod, for engaging and disengaging clutch 38: 40, a gear fast on top power shaft 34 and driving gear 36: 41, a clutch loosely socketed on the upper end of vertical splined feed shaft 27: 42, bevel gears connecting top power shaft 34 with clutch 41: 43, a sliding clutch on the upper end of vertical splined feed shaft 27 and coöperating with clutch 41: and 44, an arm fast on clutch rod 30 and engaging sliding clutch 43.

Clutch rod 30 is preferably made as light as practicable, my preference being to form it of a hollow tube, and spring 33 should not be capable of raising the rod from its lowest position, its office being merely to lighten the labor of lifting the rod.

Normally, when the boring mill is at work, the clutch rod will be in its lowest position and clutches 28—29 will be engaged, and clutch 43 disengaged, under which conditions long shaft 27 will form a prolongation of vertical feed shaft 22. The power mechanism driving the table through the medium of shaft 18, will then transmit feeding motion to feed gear 14 in direction and at speed controlled by the adjustments at speed-box 25, as usual.

If it be desired to raise or lower the rail, the table being at rest in general cases, rail clamps 10 are loosened, clutch 38 is to be engaged, and motion is to be given to top power shaft 34 in proper direction. This top power shaft 34 may, if desired, be in constant motion. My preference is to drive this top shaft by a reversible electric motor. When the rail has been properly adjusted then clutch 38 is thrown out of engagement.

Assume, now, that the saddle is to be fleeted along the rail. In such case slip gear 15 is to be placed on the end of feed-screw 11 to engage gear 14, and clutch 43 is to be engaged with clutch 41, by raising handle 31 which act disengages clutch 29. The top power shaft 34, turning in selective direction, will now give to splined shaft 27 motion at a very much higher rate of speed than that of its mere feeding motion and rail screw 11 will be turned at corresponding high rate and the saddle fleeted accordingly. If, instead of fleeting the saddle along the rail, it be desired to fleet the tool bar vertically in the saddle, then slip gear 15 is employed on feed rod 13. As the general construction of this class of machines imposes fixed limitations to the travel of the saddle on the rail, and to the travel of the tool bar in the saddle, and as the nature of the work on the machine imposes other limitations, the construction of the fleeting mechanism described has been made such that the fleeting motion will continue only so long as the clutch rod is held up by handle 31, the release of that handle permitting long splined shaft 37 to again go into normal positive connection with vertical feed shaft 22.

The fleeting of either tool bar of a double saddle machine may be done by the fleeting mechanism at either side of the machine, it being understood that the mechanism illustrated in the drawing for one side of the machine is duplicated at the other side. But for fleeting the saddles of double saddle machines recourse will be had to the fleeting mechanism at the appropriate side of the machine.

I claim:—

1. In a machine tool of the class described, the combination, substantially as set forth, of a rail, feed gearing thereon, a vertically disposed splined shaft operatively connected with the feed gearing on the rail of the machine, power driven mechanism disposed at the base of said splined shaft, power driven mechanism disposed at the top of said splined shaft, and hand operative clutches at the lower and upper ends of said splined shaft to serve in connecting it at will with either of said power driven mechanisms independently.

2. In a machine tool of the class described, the combination, substantially as set forth, of a rail, feed gearing thereon, a vertically disposed splined shaft operatively connected with the feed gearing on the rail of the machine, power driven mechanism disposed at the base of said splined shaft, power driven mechanism disposed at the top of said splined shaft, clutches at the lower and upper ends of said splined shaft to serve in connecting it at will with either of said power driven mechanisms independently, and hand operative mechanism connecting the two clutches for moving them in unison to disengage one clutch before engaging the other clutch.

3. In a machine tool of the class described, the combination, substantially as set forth, of a rail, feed gearing thereon, a vertically disposed shaft operatively connected with the feed gearing on the rail, power-driven mechanism disposed at the base of said shaft, power driven mechanism disposed at the top of said shaft, clutches at the lower and upper ends of said shaft to serve in connecting the shaft at will with either of said power driven mechanisms independently, and hand-operative mechanism connecting the two clutches for moving them in unison to disengage one clutch before engaging the other clutch, the lower clutch being capable of automatically engaging when the hand is removed from said hand-operative mechanism.

4. In a machine tool of the class described, the combination, substantially as set forth, of a rail, feed gearing thereon, a vertically disposed splined shaft operatively connected with the feed gearing on the rail of the machine, power driven mechanism disposed at the base of said splined shaft, power driven mechanism disposed at the top of said splined shaft, clutches at the lower and upper ends of said splined shaft to serve in connecting it at will with either of said power driven mechanisms independently, a vertically movable rod disposed parallel with said splined shaft, connections between said vertically movable rod and said clutches whereby said vertically movable rod by its gravity moves downward and automatically disengages from the upper clutch and engages the lower clutch, and a handle for raising said vertically movable rod to disengage the lower clutch and engage the upper one.

AUGUSTUS WOOD.

Witnesses:
SAM D. FITTON, Jr.,
M. S. BELDEN.